(12) United States Patent
Yao et al.

(10) Patent No.: US 12,534,400 B2
(45) Date of Patent: Jan. 27, 2026

(54) FABRICATION TECHNIQUE FOR WIRE GRID POLARIZER

(71) Applicant: II-VI Delaware, Inc., Wilmington, DE (US)

(72) Inventors: Junjie Yao, Fuzhou (CN); Jianying Zhang, Fuzhou (CN); Xiaolian Zhou, Fuzhou (CN); Xu Jia, Fuzhou (CN); Lei Lin, Fuzhou (CN); Guanglong Yu, Fuzhou (CN)

(73) Assignee: II-VI DELAWARE, INC., Wilmington, DE (US)

( * ) Notice: Subject to any disclaimer, the term of this patent is extended or adjusted under 35 U.S.C. 154(b) by 117 days.

(21) Appl. No.: 18/236,975

(22) Filed: Aug. 23, 2023

(65) Prior Publication Data

US 2024/0076231 A1    Mar. 7, 2024

(30) Foreign Application Priority Data

Sep. 2, 2022  (CN) .......................... 202211072925.8

(51) Int. Cl.
| | |
|---|---|
| *C03C 17/36* | (2006.01) |
| *C03C 15/00* | (2006.01) |
| *G02B 5/30* | (2006.01) |

(52) U.S. Cl.
CPC .......... *C03C 17/3657* (2013.01); *C03C 15/00* (2013.01); *C03C 17/3605* (2013.01); *C03C 2217/21* (2013.01); *C03C 2217/285* (2013.01); *C03C 2218/151* (2013.01); *C03C 2218/156* (2013.01); *C03C 2218/31* (2013.01); *G02B 5/3025* (2013.01)

(58) Field of Classification Search
None
See application file for complete search history.

(56) References Cited

U.S. PATENT DOCUMENTS

| | | | |
|---|---|---|---|
| 2008/0186576 A1* | 8/2008 | Takada | G02B 5/3025 349/5 |
| 2018/0067246 A1* | 3/2018 | Oowada | B32B 15/04 |
| 2021/0231853 A1* | 7/2021 | Hiroyuki | C03C 17/3657 |

* cited by examiner

*Primary Examiner* — Shamim Ahmed
(74) *Attorney, Agent, or Firm* — McAndrews, Held & Malloy, Ltd.

(57) ABSTRACT

A proposed fabrication technique for a polarization-absorbing wire grid polarizer avoids the need to etch through the multilayer stack of materials to form the grid structure. Initial reflective metal and dielectric buffer layers are patterned and etched in a conventional manner to create the desired grid topology. A small-angle coating process is then used to complete the fabrication process by first coating the top surface of the patterned dielectric with a polarization-absorbing metal. A second coating process is used to cover the created metal coating with a dielectric cladding material. Maintaining a small angle of incidence between the coating source and the wire grid structure ensures that top portions of the grid are suitably covered to create the desired multilayer wire configuration.

19 Claims, 5 Drawing Sheets

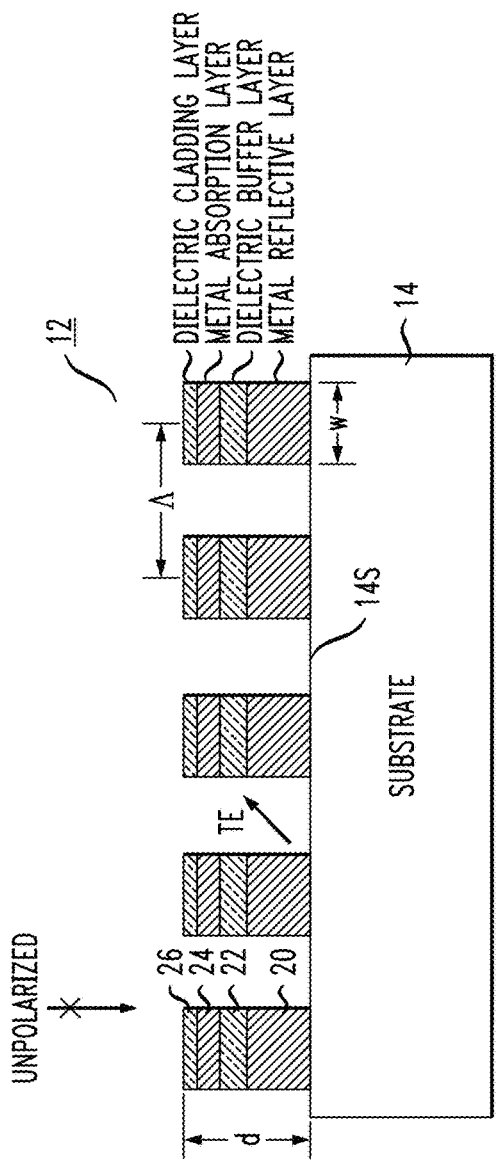
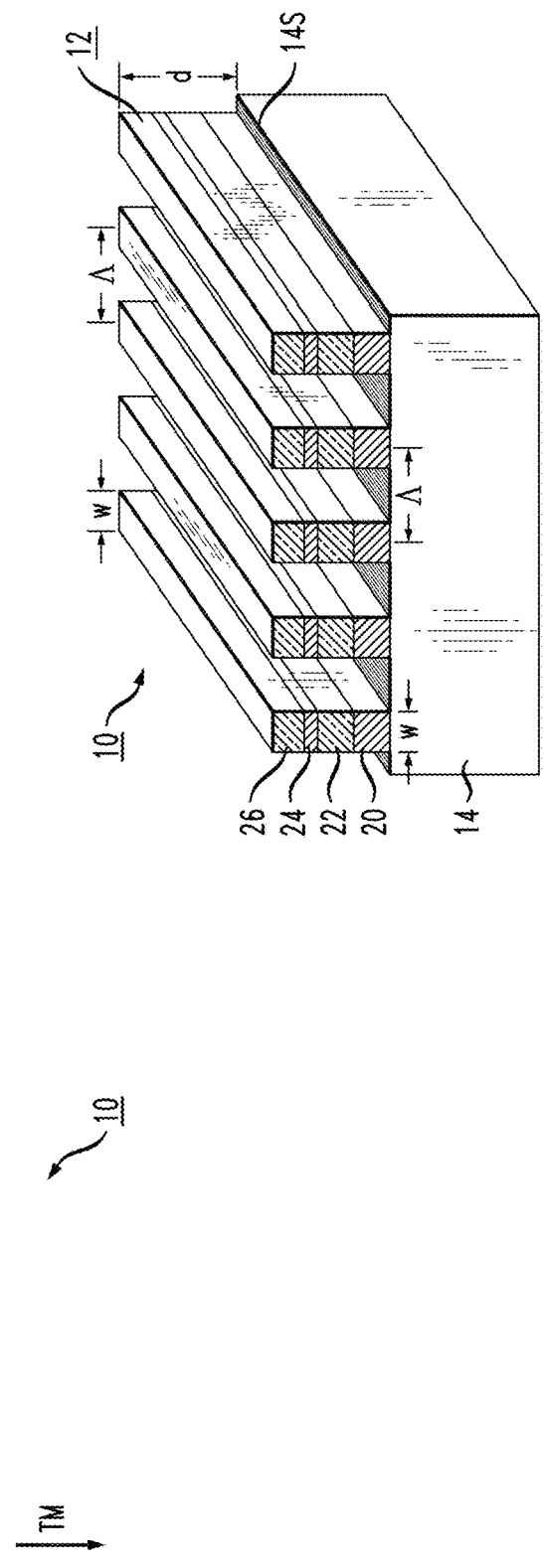
FIG. 1
FIG. 2

FABRICATION TECHNIQUE FOR WIRE GRID POLARIZER

TECHNICAL FIELD

Disclosed is a method of fabricating a wire grid polarizer as used in optical systems and particularly to a method of fabricating a wire grid polarizer having at least one component being a polarization absorbing metal.

BACKGROUND

A wire grid polarizer is used to split an incoming light wave into a pair of mutually perpendicular polarization states, one of which is transmitted and the other reflected (or perhaps absorbed). This type of polarizer is known to exhibit a high extinction ratio, strong environmental adaptability, and low wavelength sensitivity. Additionally, a wire grid polarizer is known to be able to achieve high transmittance and high contrast of incident light waves in a large incident angle, spectral range, and operating temperature range. As such, these devices have found a variety of uses including, but not limited to, polarization beam splitters, display devices, and image sensors.

In the specific case of a polarization-absorbing wire grid polarizer, a multilayer structure of alternating dielectric and metal materials is required, with one of the metal layers used to absorb the unwanted polarization state of the propagating light wave. In conventional fabrication techniques, the various layers are deposited in sequence on a substrate, with the multilayer arrangement then patterned and etched to form the necessary grid configuration. There exist difficulties related to etching through materials of different composition (i.e., dielectric materials versus metal) which are known to impact product yield and production cost in the case of such a polarization-absorbing wire grid polarizer that comprises alternating layers of metal and dielectric.

SUMMARY

A fabrication technique for a polarization-absorbing wire grid polarizer is proposed which avoids the need to etch through the multilayer stack of materials to form the wire grid structure. Instead, it is proposed to pattern and etch an initial pair of metal and dielectric layers to create the desired grid topology. A coating process is then used to complete the fabrication process. In particular, a small-angle coating process is used to first coat the patterned dielectric with a metal material (selected to absorb the unwanted polarization state), with a second coating process used to coat the formed metal with a second dielectric material (used as a cladding layer in the multilayer structure).

The small-angle coating process may use one of several known techniques, such as a sputter deposition process or a vacuum evaporation process. The wire grid structure being fabricated is oriented with respect to the coating source such that the coating material arrives at the wire grid structure at the desired "small" angle, for example at an angle no greater than about 10°. Maintaining the small angle of incidence ensures that the coating material covers the top portions of the wire grid structure.

An example embodiment of the disclosed process may take the form of a method of manufacturing a wire grid polarizer that includes the steps of: providing an optically transparent substrate, the optically transparent substrate having a top major surface; depositing a layer of reflective metal to cover the top major surface of the optically transparent substrate; depositing a layer of dielectric buffer material to cover the deposited layer of reflective metal; patterning the layer of dielectric buffer material to define a selected wire grid pattern; etching the combination of the reflective metal and dielectric buffer material layers to remove regions exposed by the patterning material and create a plurality of wire grid stubs; coating a top portion of each wire grid stub of the plurality of wire grid stubs with a polarization absorbing metal material, creating a metal coated surface on each wire grid stub; and coating the metal coated surface on each wire grid stub with a dielectric material to form a dielectric cladding as a top layer of the wire grid polarizer.

Other and further aspects and embodiments of the disclosed method will become apparent during the course of the following discussion and by reference to the accompany drawings.

BRIEF DESCRIPTION OF THE DRAWINGS

Referring now to the drawings, where like numerals represent like parts in several views:

FIG. 1 is a side view of a polarization absorbing wire grid polarizer;

FIG. 2 is an isometric view of the wire grid polarizer of FIG. 1;

DETAILED DESCRIPTION

Figure 3:
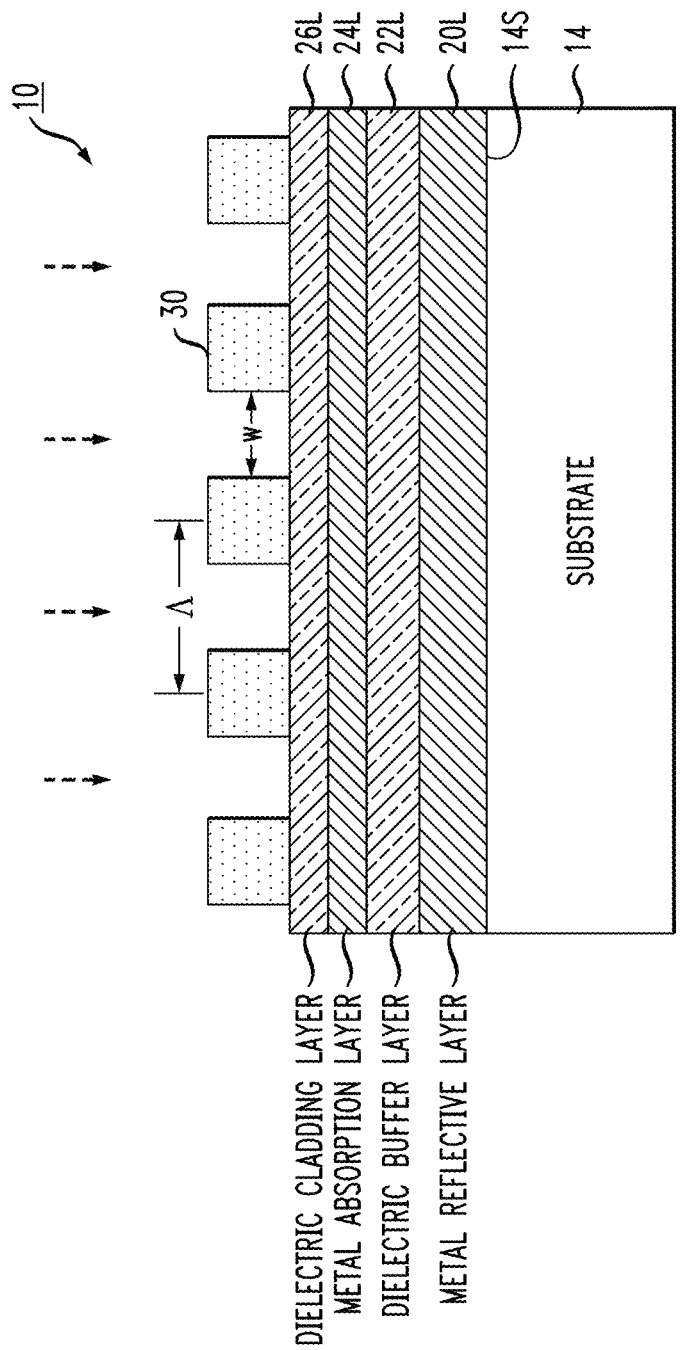
FIG. 3 depicts a structure as created during a prior art process used to form the wire grid polarizer of FIG. 1, including the deposition of several layers over a substrate of optically transparent material and the inclusion of a patterning layer on the top of these several layers.

Wire grid polarizers have a variety of uses, including but not limited to, polarization beam splitters (e.g., broadband splitters), display devices (such as 3D/LCD projectors and vehicle heads-up display apparatus), and image sensors such as polarization imaging for biomedicine applications). FIG. 1 is a cut-away side view of a polarization absorbing wire grid polarizer 10, which comprises a plurality of parallel, elongated wires 12 that are disposed on an optically transparent substrate 14. Substrate 14 may comprise glass, quartz, fused silica or the like. FIG. 2 is an isometric view of wire grid polarizer 10 of FIG. 1, clearly showing the parallel, elongated topology of the plurality of wires 12 as formed on substrate 14. Referring to both FIGS. 1 and 2, the various dimensions associated with the structure of wire grid polarizer 10 are shown, including the width w and height d of each wire 12i. The center-to-center spacing between adjacent wires 12, referred to as the "pitch" and shown as A, is a factor in achieving the desired polarization splitting of an unpolarized incoming beam. Indeed, it is important for all of these dimensions to be well-controlled in order to provide the desired split between polarization states with a high extinction ratio, and operable across a relatively wide wavelength range of interest.

In this case of creating a polarization-absorbing wire grid polarizer, wires 12 comprise a stacked, multilayer form of alternating metal and dielectric materials, which is necessary in order to allow for any light propagating along the unwanted polarization state to be absorbed in a manner that minimizes any further propagating of this polarization state. In particular, wires 12 are shown as comprising a multilayer stack formed of a reflective metal 20 covered by a dielectric buffer 22. In the formation of polarization absorbing wire grid polarizer, a polarization-absorbing metal 24 is disposed over dielectric buffer 22, with a dielectric cladding 26 disposed over metal 24 as the top layer of the stacked, multilayer structure. In particular, metal 24 comprises a polarization absorbing material that is selected to absorb one polarization of a propagating optical beam (for example, the TE polarization) and allow the orthogonal polarization (e.g., the TM polarization) to continue to propagate through optically transparent substrate 14. Materials suitable for use as reflective metal 20 and polarization-absorbing metal 24 include, but are not limited to, aluminum, silver, copper, chromium, germanium, titanium, iron, and silicon. Possible material choices for dielectric buffer 22 and cladding 26 comprise metal oxides, such as $SiO_2$, $Ta_2O_3$, $Al_2O_3$, $MgF_2$, and the like.

FIG. 3 depicts a prior art process typically used in forming polarization absorbing wire grid polarizer 10. In particular, continuous layers of each of the enumerated materials described above are deposited to completely coat a top major surface 14S of substrate 14. That is, a full layer 20L of reflective metal is first deposited to cover substrate 14, followed by a layer 22L of dielectric buffer material, with metal polarization absorbing layer 24L and dielectric cladding layer 26L also formed to completely cover the underlying structure. Once all of these layers are formed, a patterning layer defining the topology of the desired wire grid layout (in terms of pitch, number of wires, width w, and the like as shown in FIGS. 1 and 2) is disposed over cladding layer 26L. Following this, a multi-step etch process is used to remove the exposed portions of the individual layers, where each material requires a different etchant as a result of the alternating arrangement of metal and dielectric layers. That is, the etchant used to remove exposed regions of cladding layer 26L is not capable of removing the exposed regions of metal polarization absorbing layer 24L, etc. As the number of etched layers increases, the yield of acceptable devices has been found to rapidly reduce, leading to increases in the cost of the final product.

Figure 4:
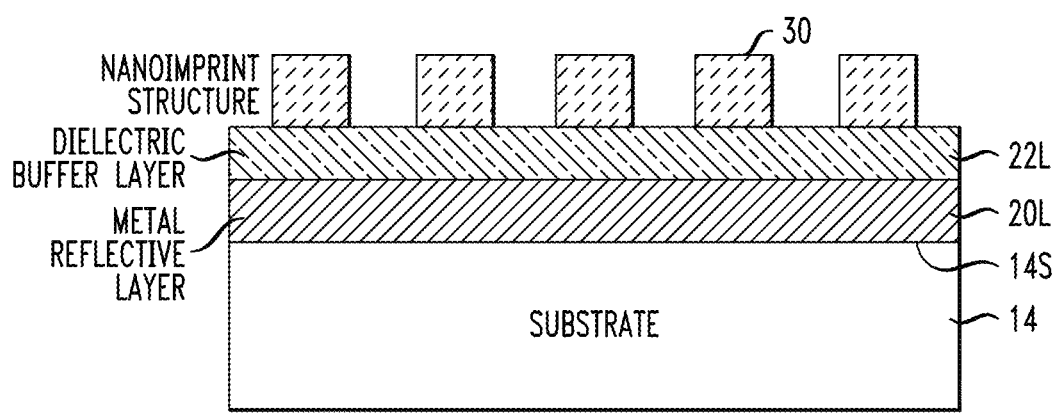
FIG. 4 depicts a structure as initially created in the disclosed method of forming a polarization absorbing wire grid polarizer, including forming reflective metal and dielectric buffer layers.
Figure 5:
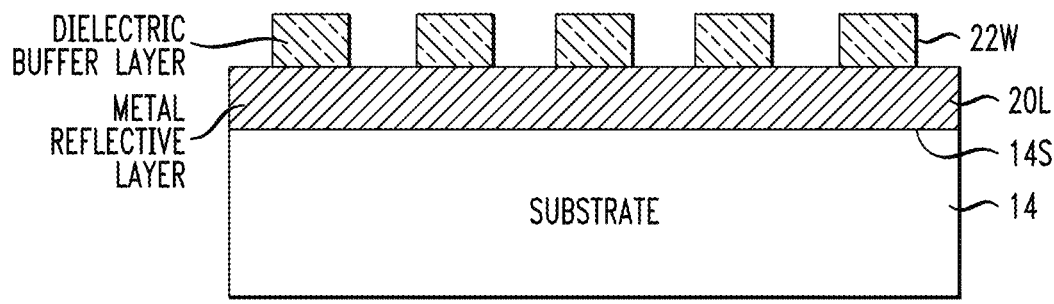
FIG. 5 shows a following step in the disclosed method, illustrating the etching of the dielectric buffer layer to exhibit the desired wire grid topology.

Disclosed herein is an improved process of forming a polarization-absorbing wire grid polarizer that eliminates the need to perform the multiple etching steps that directly impact the product yield. Instead, a combination of etching and small-angle coating is used to form the wire grid topology. FIG. 4 illustrates an initial step in the disclosed process, specifically directed to forming metal reflective layer 20L and dielectric buffer layer 22L over substrate 14. Dielectric buffer layer 22L is used as a mask layer for patterning the underlying metal. Indeed, a patterning layer 30 is subsequently applied to buffer layer 22L, where a standard lithography or nanoimprinting process (or any other suitable patterning process well-known in the art) is used to transfer the wire grid pattern into dielectric buffer 22L, creating dielectric wire regions 22W as shown in FIG. 5. A conventional etching process is then used to transfer the grid pattern of dielectric wire regions 22W into underlying metal layer 20L. The result of this etching step is shown in FIG. 6, where the duration of the etching process is controlled to retain a desired thickness t of dielectric wire regions 22W.

Figure 6:
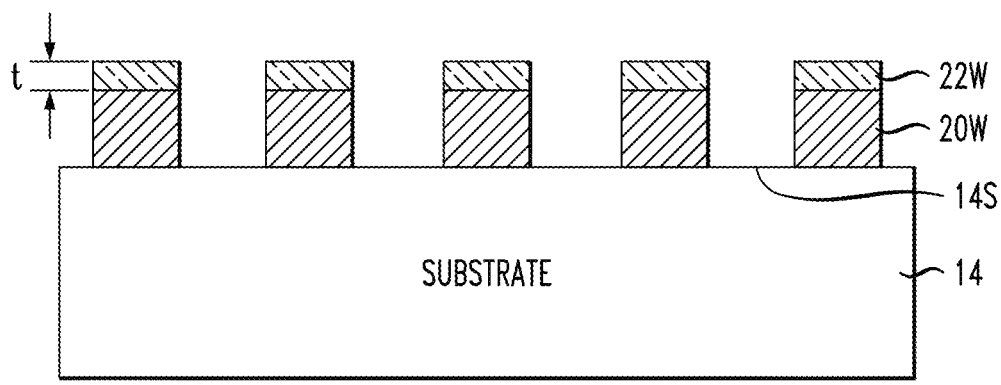
FIG. 6 illustrates the next step in the disclosed process, where the wire grid pattern is transferred to the reflective metal layer using an etch process.
Figure 7:
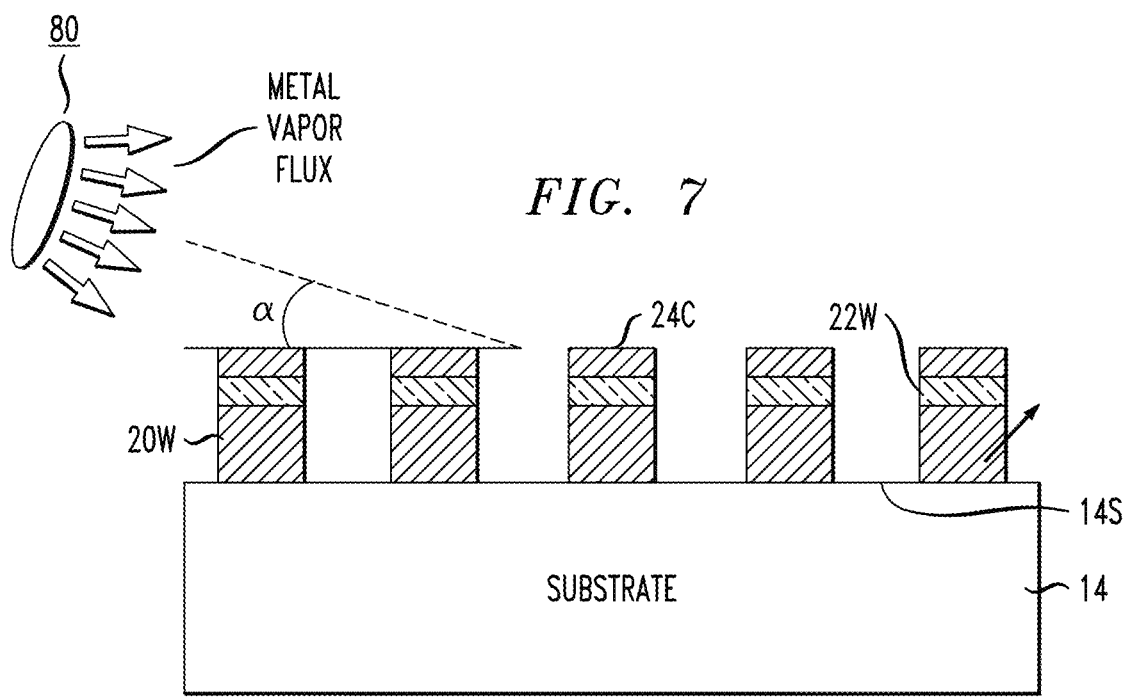
FIG. 7 shows a following step in the disclosed formation process, in particular illustrating the use of a small-angle coating process to deposit a layer of polarization absorbing metal on the individual wires forming the grid.

Once the combination of reflective metal 20 and dielectric buffer 22 have been patterned and etched as shown FIG. 6, a small-angle coating process is used to coat each initial wire structure with a layer of polarization-absorbing metal, followed by a layer of cladding dielectric. FIG. 7 illustrates a first coating process, using a source 80 to direct a suitable metal vapor toward the wire "stubs" comprising the dual layer reflective metal regions 20W and dielectric buffer regions 22W. The orientation of substrate 14 with respect to source 80 is controlled such that the metal vapor is directed at a relatively small angle α (referred to at times as a "glancing angle") with respect to the normal of the top surface of the wire stubs. As a result of this orientation, polarization absorbing metal coating regions 24C are formed on the top portions of buffer regions 22W. Since the incident angle α is small, the wire stubs act as a shield and prevent the metal vapor from completely coating the structure. Preferably, a glancing angle no greater than about 10° is maintained in order for the wire stubs to provide the shielding capability.

One exemplary coating process may take the form of a sputter deposition process (using, for example, a magnetron sputtering process) to create a vapor flux for a coating process. Alternatively, a vacuum evaporation process may be used to perform the coating; other known deposition/coating processes known in the art may be used as well.

Figure 8:
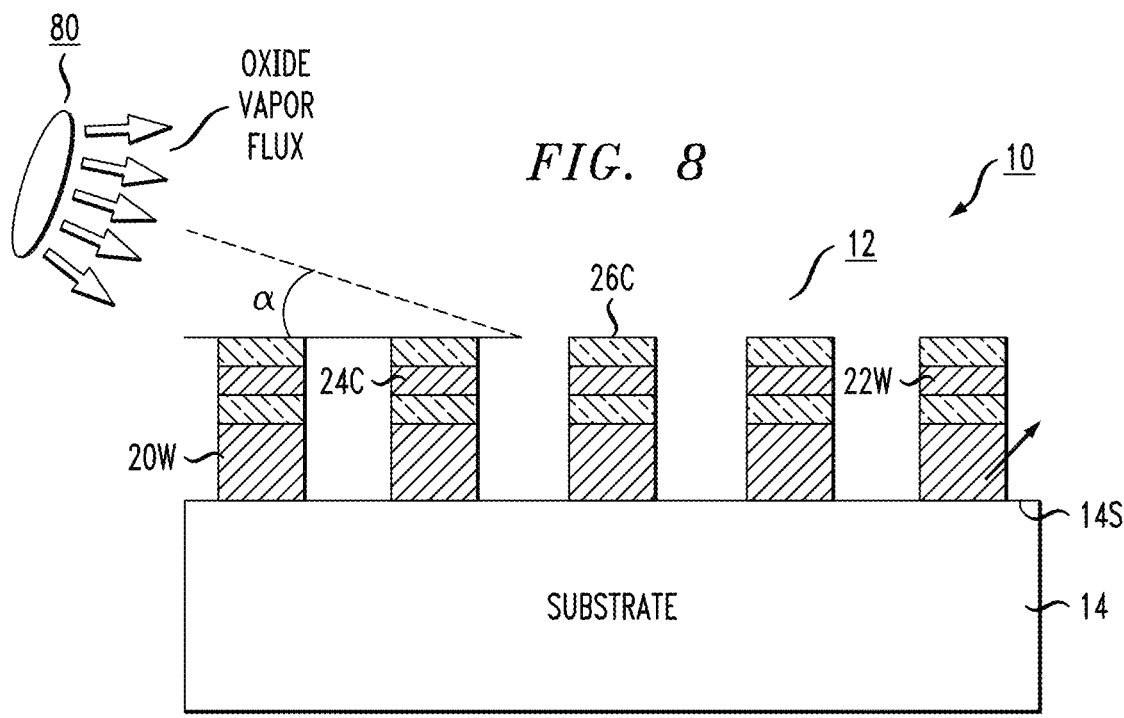
FIG. 8 depicts a final step in the disclosed formation process, shown as a small-angle coating process used to cover the tops of the individual wires of FIG. 8 with a dielectric cladding material.
Figure 9:
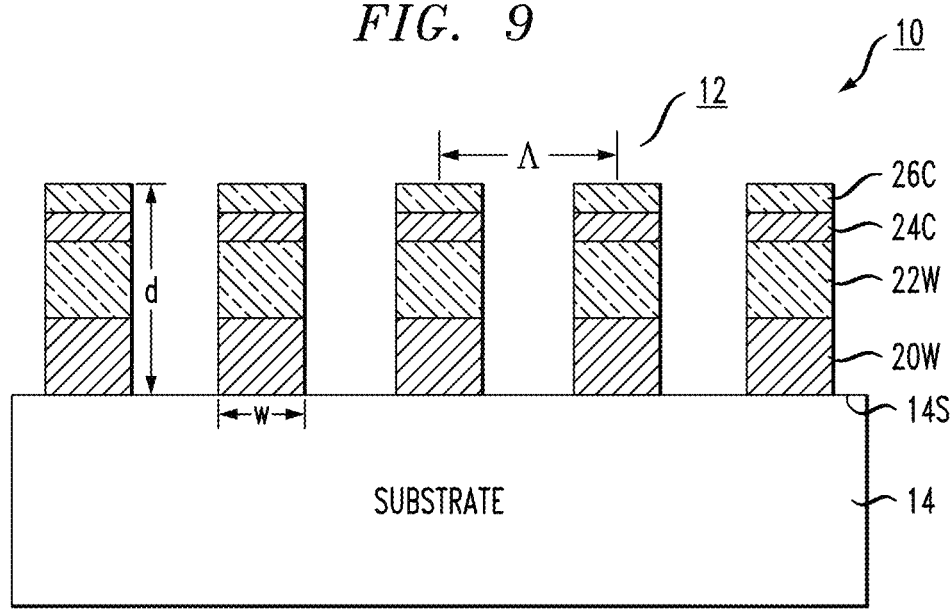
FIG. 9 shows a polarization absorbing metal wire grid polarization formed using the disclosed method.

Once a satisfactory thickness of metal coating regions 24C is obtained, a second small-angle coating process commences, in this step directing a vapor of a suitable dielectric cladding material toward the formed structure. FIG. 8 illustrates this step in the process, where dielectric coating regions 26C are shown as deposited to coat the previously-formed metal coating regions 24C. Again, the use of the small angle of incidence a prevents the dielectric material from completely coating the individual wires. FIG. 9 illustrates the final structure of polarization absorbing wire grid polarizer 10 as formed by using the combination of etching and coating in accordance with the present disclosure.

Summarizing, a method is disclosed for fabricating a polarization absorption type of metal wire grid polarizer. The manufacturing method includes the formation of the metal absorption layer and dielectric cladding layer using a small-angle coating process such as a sputter deposition process or a vacuum evaporation coating process, where the orientation between the coating source and the substrate is controlled to provide the small incidence angle necessary for coating the wire stubs. The disclosed method avoids the process of etching a variety of alternating metal and dielectric films (thus reducing the production cost), as required in the prior art, while also improving the product yield.

While the disclosed fabrication method has been described and particularly shown with reference to exemplary embodiments and materials, it will be understood by those of ordinary skill in the art that various changes in detail, including material choices, coating processes, incidence angle, and the like, may be made without departing from the principles of the disclosed method. Indeed, the exemplary embodiments should be considered as illustrative only, and not for the purposes of limitation of the scope of claims as appended hereto.

What is claimed is:

1. A method of manufacturing a polarization-absorbing wire grid polarizer comprising a plurality of elongated wires, the method comprising:
    providing an optically transparent substrate, the optically transparent substrate having a top major surface;
    depositing a layer of reflective metal to cover the top major surface of the optically transparent substrate;
    depositing a layer of dielectric buffer material to cover the deposited layer of reflective metal;
    patterning and etching the combination of the deposited layer of dielectric buffer material and the layer of reflective material to create a plurality of wire stubs for the plurality of elongated wires;
    creating a metal-coated surface on each wire stub of the plurality of wire stubs by coating, at a first glancing angle of no greater than 10°, a top portion of each wire grid stub of the plurality of wire grid stubs with a polarization-absorbing metal material; and
    forming a dielectric cladding as a top layer of each elongated wire of the plurality of elongated wires by coating, at a second glancing angle of no greater than 10°, the metal-coated surface on each wire stub with a dielectric material.

2. The method of claim 1, wherein the depositing the layer of reflective metal results in a bottom surface of the layer of reflective metal contacting the top major surface of the optically transparent substrate.

3. The method of claim 1, wherein the forming the dielectric cladding utilizes a sputter deposition process to coat the metal-coated surface on each wire stub with the dielectric material.

4. The method of claim 3, comprising shielding portions of each elongated wire from the sputter deposition process with one or more adjacent elongated wires of the plurality of elongated wires adjacent.

5. The method of claim 3, comprising shielding each elongated wire from the sputter deposition process with one or more adjacent elongated wires of the plurality of elongated wires adjacent so as to prevent completely coating the respective elongated wire with the dielectric material.

6. The method of claim 1, wherein the forming the dielectric cladding utilizes a vacuum evaporation coating process to coat the metal-coated surface on each wire stub with the dielectric material.

7. The method of claim 6, comprising shielding portions of each elongated wire from the vacuum evaporation coating process with one or more adjacent elongated wires of the plurality of elongated wires adjacent.

8. The method of claim 6, comprising shielding each elongated wire from the vacuum evaporation coating process with one or more adjacent elongated wires of the plurality of elongated wires adjacent so as to prevent completely coating the respective elongated wire with the dielectric material.

9. The method of claim 1, wherein the reflective metal is selected from the group consisting of:
    aluminum, silver, copper, chromium, germanium, titanium, iron, and silicon.

10. The method of claim 1, wherein the dielectric buffer material comprises a metal oxide.

11. The method of claim 10, wherein the metal oxide is selected from the group consisting of: $SiO_2$, $Ta_2O_3$, $Al_2O_3$, and $MgF_2$.

12. The method of claim 1, wherein the polarization-absorbing metal material is selected from the group consisting of: aluminum, silver, copper, chromium, germanium, titanium, iron, and silicon.

13. The method of claim 1, wherein the dielectric cladding material comprises a metal oxide.

14. The method of claim 13, wherein the metal oxide is selected from the group consisting of: $SiO_2$, $Ta_2O_3$, $Al_2O_3$, and $MgF_2$.

15. A method of manufacturing a polarization-absorbing wire grid polarizer comprising a plurality of elongated wires, the method comprising:
    providing wire stub structure comprising an optically transparent substrate and a plurality of wire stubs, wherein each wire stub comprises a reflective metal layer on a top major surface of the optically transparent substrate and a dielectric buffer layer on its reflective metal layer;
    coating, at a first glancing angle of no greater than 10°, each wire stub with a polarization-absorbing metal material to form a polarization-absorbing metal layer on the dielectric buffer layer of each wire stub; and
    coating, at a second glancing angle of no greater than 10°, each wire stub with dielectric material to form a dielectric cladding layer on the polarization-absorbing metal layer of each wire stub.

16. The method of claim 15, wherein the coating each wire stub with the dielectric material partially coats each wire stub with the dielectric material due to shielding of adjacent wire stubs.

17. The method of claim 15, wherein the coating each wire stub with the dielectric material utilizes a sputter deposition process that partially coats each wire stub with the dielectric material due to shielding of adjacent wire stubs.

18. The method of claim 15, wherein the coating each wire stub with the dielectric material utilizes a vacuum evaporation coating process that partially coats each wire stub with the dielectric material due to shielding of adjacent wire stubs.

19. The method of claim 15, comprising shielding the top major surface from the coating of each wire stub with the dielectric material.

* * * * *